United States Patent [19]

Graf

[11] Patent Number: 5,433,990
[45] Date of Patent: Jul. 18, 1995

[54] MOLDED PARTS WITH A PREPARED ADHERING SURFACE

[75] Inventor: Hans Graf, Buchs, Switzerland

[73] Assignee: Hilti Aktiengesellschaft, Fürstentum, Liechtenstein

[21] Appl. No.: 172,677

[22] Filed: Dec. 22, 1993

Related U.S. Application Data

[63] Continuation of Ser. No. 964,741, Oct. 22, 1992, abandoned.

[30] Foreign Application Priority Data

Nov. 2, 1991 [DE] Germany .................. 41 36 145.8

[51] Int. Cl.6 ..................... B32B 5/16; B32B 3/02
[52] U.S. Cl. ..................... 428/143; 428/148; 428/149; 428/150; 428/192; 428/325; 428/331
[58] Field of Search ............... 428/141, 143, 148, 149, 428/150, 192, 323, 325, 331, 343

[56] References Cited

U.S. PATENT DOCUMENTS

| | | |
|---|---|---|
| 3,523,849 | 8/1970 | Dunsby ................... 428/150 X |
| 3,595,947 | 7/1971 | Wielinga .................. 428/150 X |
| 3,764,455 | 10/1973 | Lovell et al. .............. 428/149 |
| 4,205,109 | 5/1980 | France et al. .............. 428/150 |
| 4,267,221 | 5/1981 | Ishikawa .................. 428/150 X |
| 4,689,259 | 8/1987 | Miller, Jr. et al. ......... 428/149 X |
| 4,996,114 | 2/1991 | Darrow ................... 428/143 X |
| 5,206,068 | 4/1993 | Kalkanoglu ............... 428/143 |

*Primary Examiner*—Daniel R. Zirker
*Attorney, Agent, or Firm*—Anderson Kill Olick & Oshinsky

[57] ABSTRACT

A molded part formed of a liquid or pasty materials has a prepared outside surface for adhering to another molded part having a similar adhering surface. A prepared foil with individual members protruding from two opposite surfaces is placed in the mold before the molded part is poured. The protruding members on one side of the foil are bonded into the molded part. When the molded part is removed from the mold, the protruding members on the other side are exposed and can receive a suitable bonding agent whereby this molded part can be secured to another similar molded part.

2 Claims, 2 Drawing Sheets

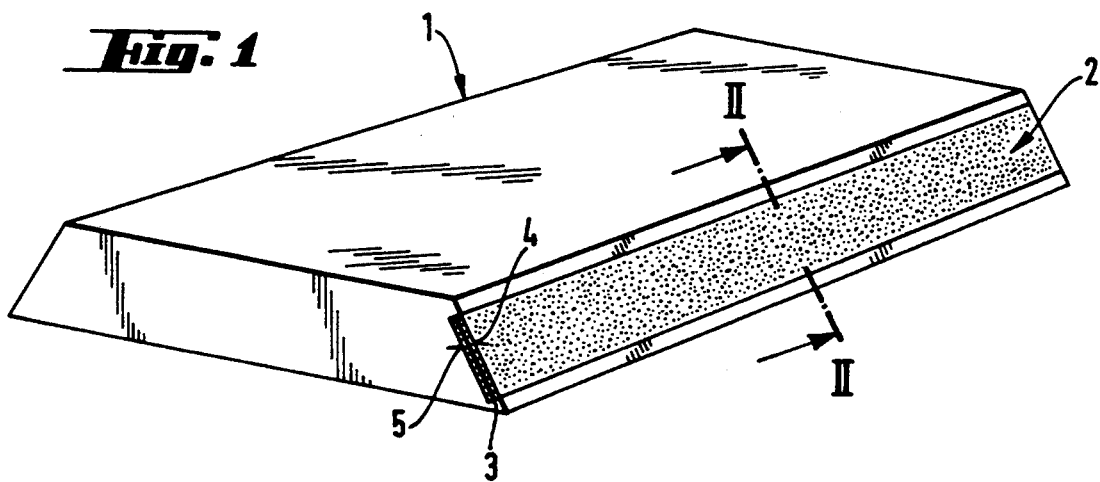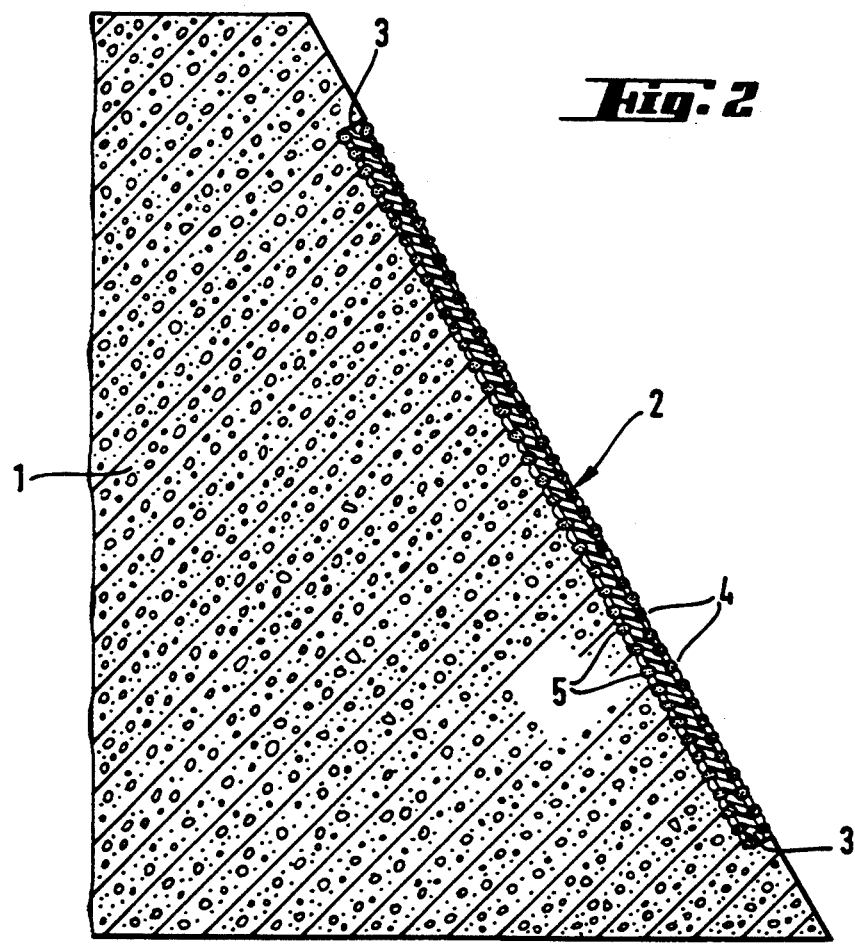

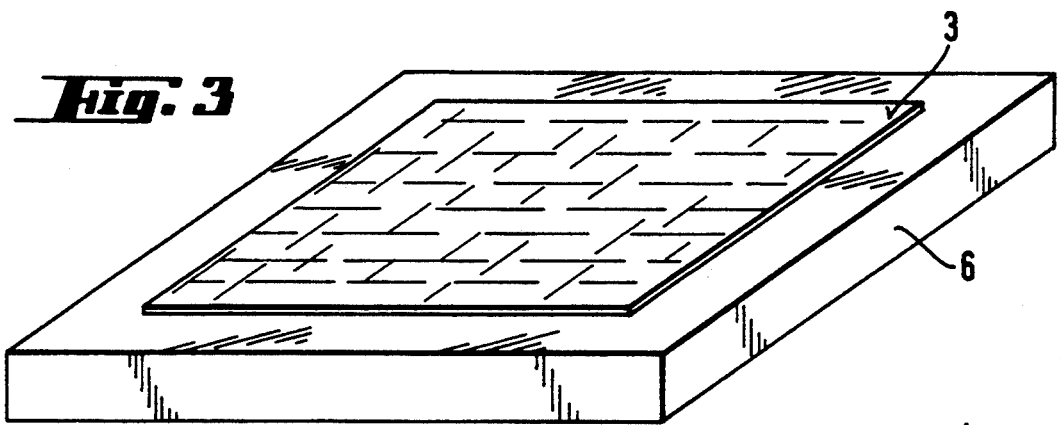
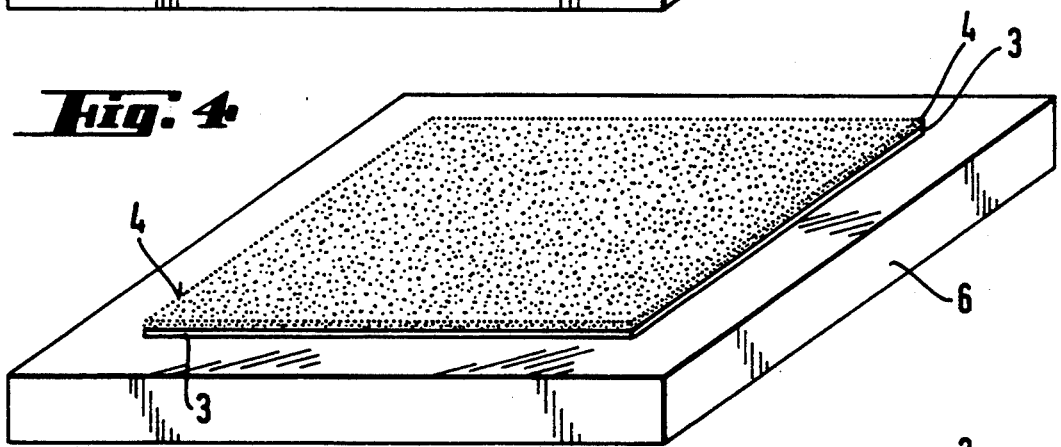
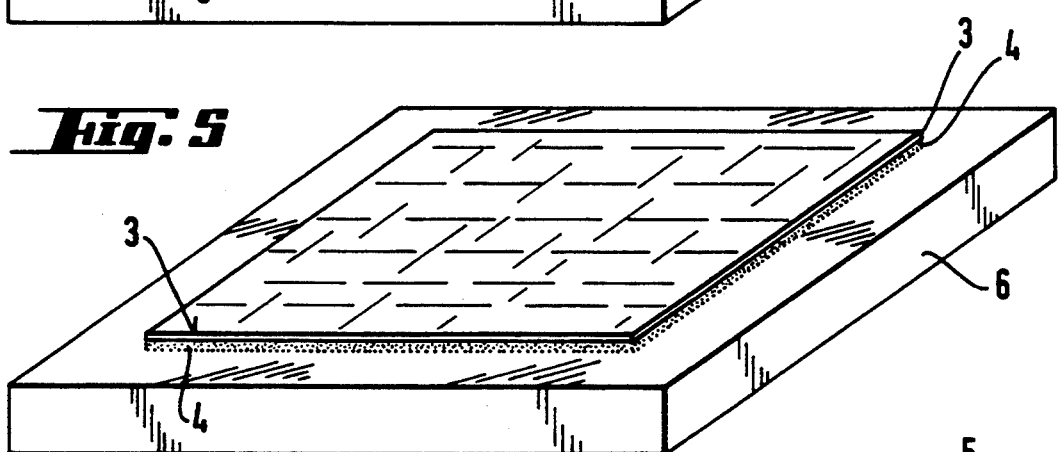
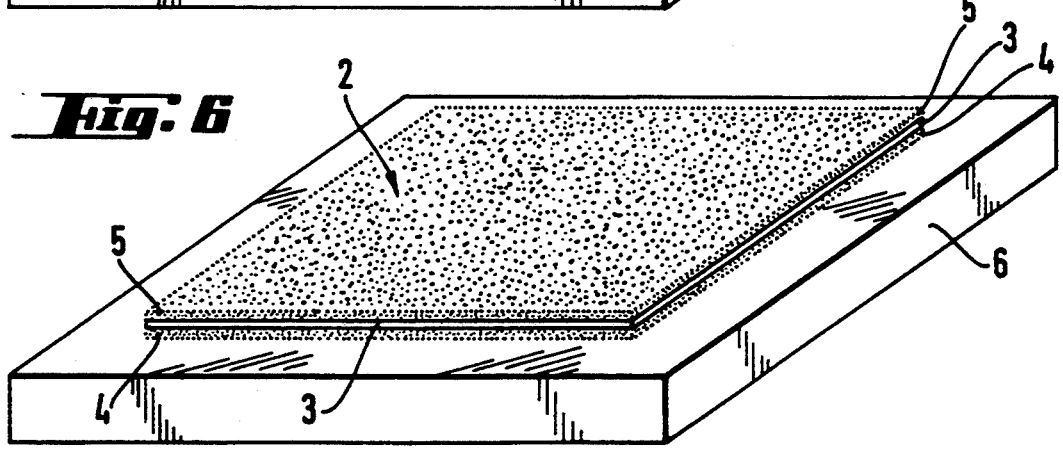

MOLDED PARTS WITH A PREPARED ADHERING SURFACE

This is a continuation application of Ser. No. 07/94,741, filed Oct. 22, 1992, now abandoned.

BACKGROUND OF THE INVENTION

The present invention is directed to molded parts formed of liquid or pasty materials with a prepared surface for adhering to a surface on another molded part also formed of liquid or pasty materials.

At the present time, increasingly finished molded parts formed of liquid or pasty materials are connected adhesively of one another. Such molded parts can consist of different materials, organic or inorganic. As an example, the molded parts can be formed of an inorganic material such as cement with the molded parts cast in a form acting as a mold. In addition, it is possible to utilize organic synthetic resins as materials for the molded parts.

The adhering connection method of such molded parts provides many advantages and, in particular, is extraordinarily economical. Moreover, it is unnecessary to use other connecting elements, whereby apart from additional cost for such connecting elements, damage caused by improper attachment of the connecting elements cannot occur.

A problem with this method of connection is that the bonding must be performed very carefully. This involves, in particular, a cumbersome and difficult preparation of the adhering surface, which adhering surface, which must not only be rigorously cleaned, but must also have a specific surface geometry. Cleaning methods such as brushing, sand blasting, pickling and the like are known, however, apart from the cost involved in such methods, they can also lead to contamination of the molded parts as well as the environment.

SUMMARY OF THE INVENTION

Therefore, the primary object of the present invention is to provide an adhesive connection for molded parts where the connection involves an economically formed adhering surface meeting all the necessary requirements.

In accordance with the present invention, the adhering surface is formed of a foil placed in a mold before casting the molded parts, with the side surface of the foil facing the mold and the opposite side surface facing away from the mold each having individual members protruding from the side surfaces.

In accordance with the invention, before casting the molded part, the molded part is provided with a finished adhering surface. Since the foil has protruding members on both opposite side surfaces, adhering surfaces are provided on each of the side surfaces, with one side surface forming an interconnection with the molded part and the other side surface, with the application of an adhesive or bonding material, forming an adhering surface for connection to another molded part. The arrangement of the foil within the mold before casting the molded part results in the liquid or pasty material forming a connection with the side surface of the foil facing away from the surface of the mold due to the protruding members on the foil and without the liquid pasty material reaching the opposite side surface of the foil facing the mold. After the molded part is removed from the mold, the side surface of the foil previously facing the mold has its protruding members exposed. This exposed side surface of the foil constitutes, together with its protruding members, an adequately prepared adhering surface, so that an adhesive connection with another molded part having a similar adhering surface can be performed without any additional processing.

Another possibility in forming the molded parts as described, is that they are at least partially removed from the mold prior to the final curing or hardening and that the foil with the protruding members located on both side surfaces is rolled or pressed against the not completely cured or hardened surface of the molded part.

To assure that possible liquid components such as in cement slurry when cement is used in forming a molded part, or other contaminating materials do not reach the side of the foil facing the mold during its casting, it is also possible to protect such side surface with a removable cover of plastics material, paper or the like.

Preferably, the foil is constituted by a carrier to which the protruding materials can be adhesively connected. Such a carrier can be a simple or multiple part carrier formed of materials such as metals, textiles and also cement. Moreover, it is also possible to fabricate the carrier of a commercially available resin, such as PMMA (polymethylmethacrylate), EP (epoxy resin), UP (unsaturated polyester), PUR (polyurethane) and the like.

These carriers, and in particular those formed of cement or a resin, can contain a reinforcement, such as textile, metallic, and carbon fibers or the like.

In all of the carriers used, whether reinforced or not, sand, gravel, corundum, metallic shot or the like are suitable as the protruding members. Such materials forming the protruding members can be secured to the carrier for constituting a single unit or they can be adhesively connected to it. As an example, when a resin is used as carrier, it is possible to feed the protruding members onto the surface of the carrier prior to the curing step, so that an adequately adhesive connection is attained.

In forming a foil with such protruding members, the resin can be brushed onto a non-adhesive base and then spread with sand, gravel and the. After curing, the foil with such protruding members on one side surface can be turned over and the other, opposite side surface without protruding members can be treated with resin and subsequently with sand, gravel or the like. Such a foil having protruding members on opposite side surfaces, after it is cured, can be placed into the mold prior to casting the molded part, and it is advisable to fix the foil within the form so that it maintains the desired position.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the drawings:

FIG. 1 is a perspective view of a finished molded part with an adhering surface embodying the present invention;

FIG. 2 is an enlarged partial sectional view of the molded part of FIG. 1 taken along the line II-II; and FIGS. 3-6 illustrate the steps of the method of forming a foil with protruding members.

DETAILED DESCRIPTION OF THE INVENTION

Fig. 1 displays a finished molded part 1 formed, for instance, by casting and removed from a mold, not shown. Along one long side surface, the molded part 1 has an exposed adhering surface or area 2. As shown in FIG. 2, this adhering surface 2 is made up by a foil 3 with protruding members 4, 5 on the opposite side surfaces of the foil. While the protruding members 5 form a connection with the molded part 1, the protruding members 4 are exposed on the outside side surface. Protruding members 4 serve to receive an adhesive or bonding agent or glue for the adhesive connection with an additional molded part having a similar adhering surface. This additional part is not shown.

The process or steps of forming an adhering surface 2 similar to that in to FIGS. 1 and 2 is illustrated in FIGS. 3-6. In a first step shown in FIG. 3, a non-adhesive base surface 6 is brushed or covered with a resin. The resin forms a part of the foil 3. In FIG. 4, protruding members 4, such as sand, gravel or the like are spread over the previously deposited resin. After curing, the part of the foil 3 with the protruding members 4 is removed from the base surface 6, inverted, and the side with the protruding members 4 is placed in contact with the base surface 6 as shown in FIG. 5. The opposite side surface from the side surface with the protruding members 4 is covered with resin, completing the formation of the foil 3. Again, sand, gravel or the like is spread over the resin not as yet cured, forming the individual protruding members 5 on the second side as shown in FIG. 6. After final curing or hardening, the entire foil 3 with the protruding members 4 and 5 is removed from the base surface 6 providing an independent adhering surface 2. The foil 3 and the protruding members 4, 5 can be placed into a mold before introducing the material forming the molded part and the foil can be fixed at a predetermined position. Subsequently, the liquid or pasty material forming the molded part is introduced into the mold so that a molded part similar to that shown in FIGS. 1 and 2 is formed.

While the invention has been illustrated and described as embodied in molded parts with adhering surfaces, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is forth in the appended claims.

I claim:

1. A molded part having an outside adhering surface suitable for receiving a bonding material for bonding said molded part with another molded part, said molded part comprising a molded portion and a foil imbedded into said molded portion by being placed in a mold, in which said molded part is formed, before forming said molded part, wherein said foil comprises:
   a carrier formed of a fiber-reinforced resin and having a first side surface facing the mold and defining an outer free surface, and a second side surface facing away from the mold and defining an inner surface bondable to said molded portion, and
   individual protruding elements bonded to said first and second side surfaces, said protruding elements being selected from a group consisting of gravel, corundum, and small metallic pellets.

2. A molded part as set forth in claim 1, wherein fiber-reinforcement of said resin is formed of fibers selected from the group consisting of textile, glass, metal and carbon fibers.

* * * * *